United States Patent
Wolz et al.

(10) Patent No.: US 11,727,615 B1
(45) Date of Patent: Aug. 15, 2023

(54) NEEDLE POINT PATH EDITING

(71) Applicant: CreateMe Technologies LLC, New York, NY (US)

(72) Inventors: Ursula C. Wolz, West Orange, NJ (US); Christopher W. Dunne, West Orange, NJ (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/840,733

(22) Filed: Jun. 15, 2022

(51) Int. Cl.
| | | |
|---|---|---|
| *G06T 11/60* | (2006.01) | |
| *G06T 11/20* | (2006.01) | |
| *G06F 3/0488* | (2022.01) | |
| *G06F 3/041* | (2006.01) | |
| *G06F 3/044* | (2006.01) | |
| *G06F 3/0354* | (2013.01) | |

(52) U.S. Cl.
CPC .......... *G06T 11/60* (2013.01); *G06F 3/03545* (2013.01); *G06F 3/0441* (2019.05); *G06F 3/0442* (2019.05); *G06F 3/0488* (2013.01); *G06F 3/04162* (2019.05); *G06T 11/203* (2013.01)

(58) Field of Classification Search
None
See application file for complete search history.

(56) References Cited

U.S. PATENT DOCUMENTS

| | | | |
|---|---|---|---|
| 4,429,364 A | 1/1984 | Maruyama | |
| 4,742,786 A * | 5/1988 | Hashimoto | ............ D05B 19/08 112/102.5 |
| 4,998,489 A | 3/1991 | Hisatake | |
| 5,005,500 A | 4/1991 | Kato | |
| 5,261,341 A * | 11/1993 | Asano | .................... D05B 19/08 112/102.5 |
| 5,323,722 A | 6/1994 | Goto | |
| 5,430,658 A * | 7/1995 | Divinsky | ............... D05B 19/08 700/138 |
| 5,646,861 A * | 7/1997 | Kotaki | ............ G05B 19/40932 700/137 |
| 6,098,559 A | 8/2000 | Hirose | |
| 7,278,362 B2 | 10/2007 | Hirata | |
| 7,386,361 B2 | 6/2008 | Nobuyuki | |
| 8,074,590 B2 | 12/2011 | Bentley | |
| 8,763,542 B2 | 7/2014 | Abe | |
| 8,857,355 B2 | 10/2014 | Nomura | |
| 8,904,947 B2 | 12/2014 | Nishimura | |
| 9,014,838 B2 | 4/2015 | Muto | |
| 9,127,383 B2 | 9/2015 | Yamanashi | |
| 9,133,572 B2 | 9/2015 | Nishimura | |
| 9,145,632 B2 | 9/2015 | Matsushima | |
| 9,200,397 B2 | 12/2015 | Goldman | |
| 10,577,736 B2 | 3/2020 | Hara | |
| 2007/0101918 A1* | 5/2007 | Kaymer | ............... G05B 19/408 112/475.17 |

(Continued)

*Primary Examiner* — David H Chu

(57) ABSTRACT

Embodiments herein describe techniques for editing a needle point path displayed on a touch screen. For example, a stylus can be used to select a portion of the needle point path which can then be moved, rotated, shrunk/enlarged, deleted, replaced, copied, etc. The embodiments herein may convert the selected portion of the needle point path into a graphics region which can then be manipulated. Once edited, the path can then be added back to the needle point path.

20 Claims, 13 Drawing Sheets

(56) References Cited

U.S. PATENT DOCUMENTS

| | | | |
|---|---|---|---|
| 2007/0129840 A1* | 6/2007 | Nobuyuki | D05B 19/14 700/138 |
| 2009/0286039 A1* | 11/2009 | Weedlun | G16Z 99/00 358/1.9 |
| 2010/0180809 A1* | 7/2010 | Albano | D05B 19/08 700/138 |
| 2011/0087728 A1 | 4/2011 | Goldman | |
| 2013/0054001 A1* | 2/2013 | Chan | D05C 5/06 700/138 |
| 2013/0233222 A1 | 9/2013 | Nishimura | |
| 2014/0182499 A1* | 7/2014 | Matsushima | D05B 19/12 700/137 |
| 2016/0032508 A1 | 2/2016 | Tokura | |
| 2018/0044830 A1* | 2/2018 | Kadowaki | D05B 69/00 |
| 2018/0371661 A1 | 12/2018 | Hara | |
| 2019/0093267 A1 | 3/2019 | Yamanashi | |

* cited by examiner

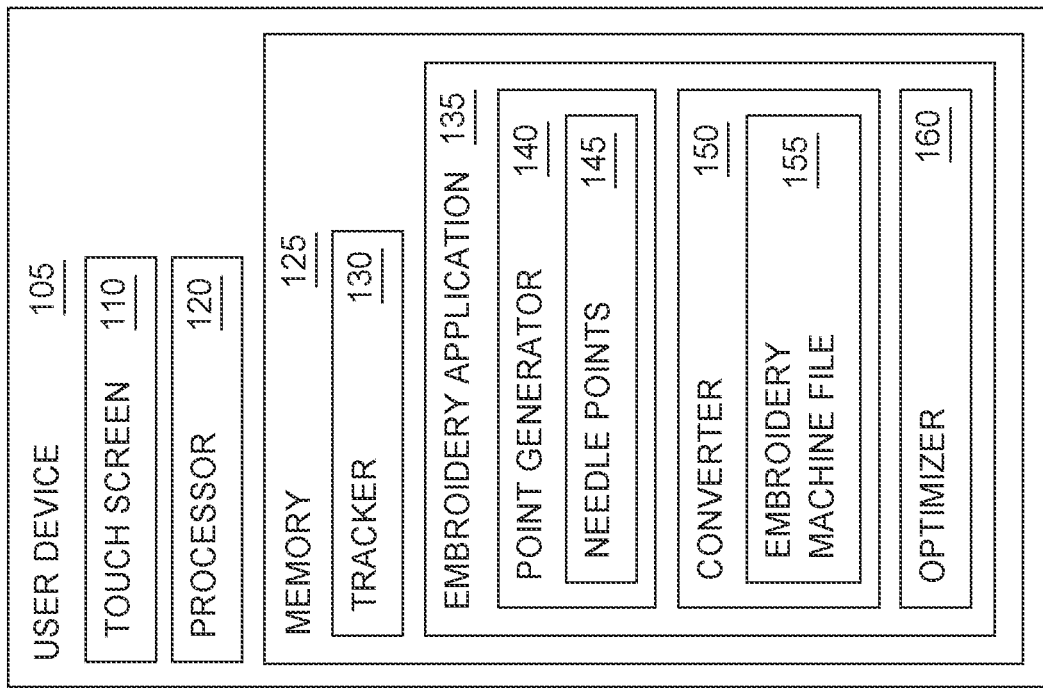
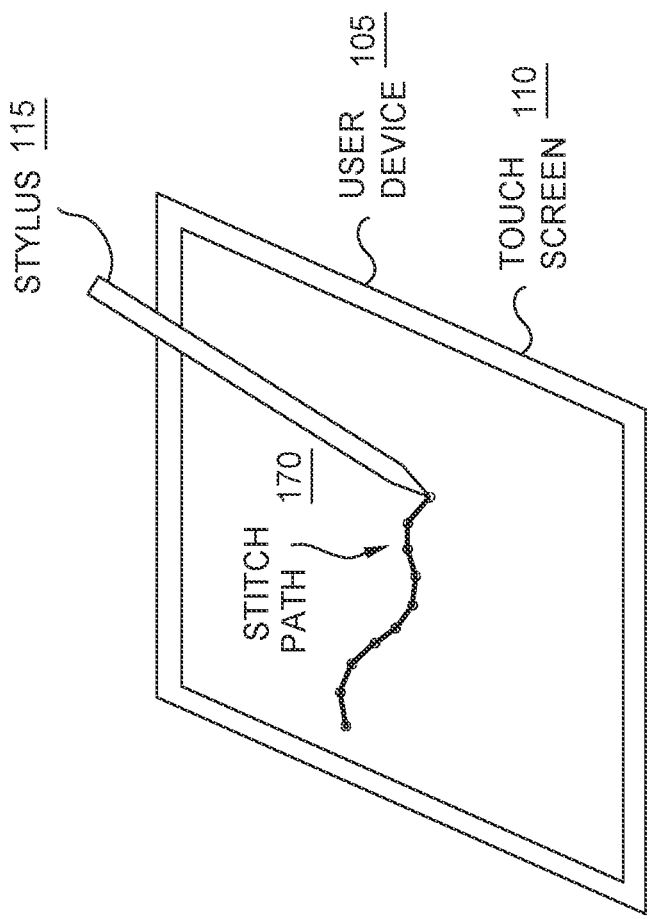
FIG. 1

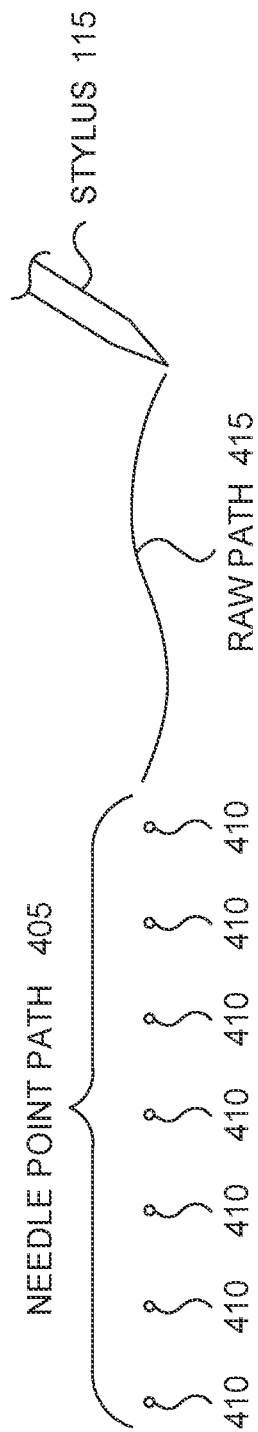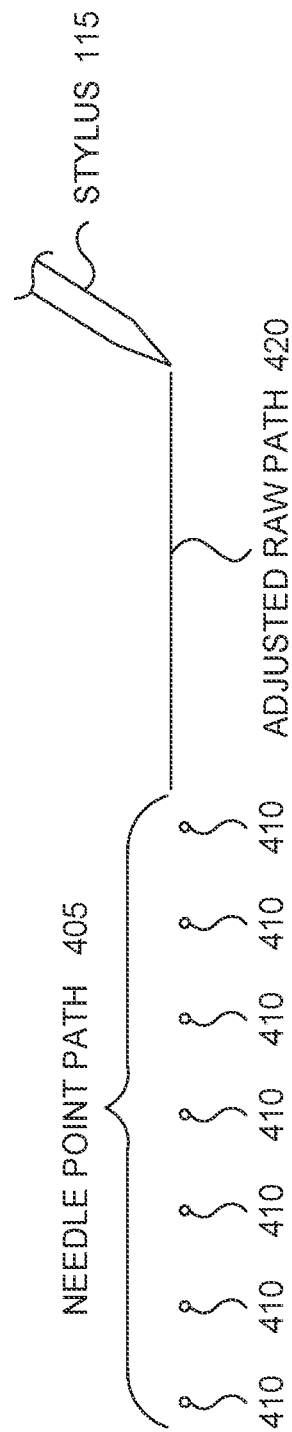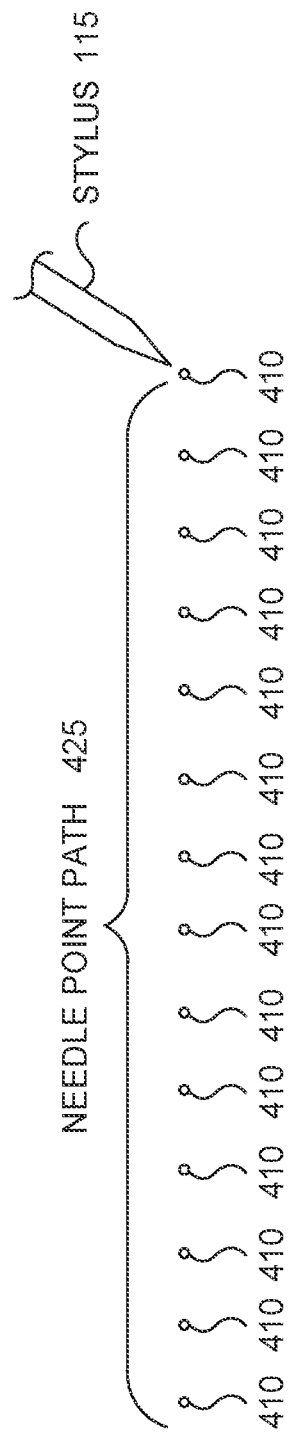

NEEDLE POINT PATH EDITING

BACKGROUND

There are two primary ways for embroidering designs into fabric or other materials using an embroidery machine. The first way is a manual procedure where a skilled artisan manipulates hooped fabric around a stationary needle of an embroidery machine. The second way uses an embroidery machine file that lists the needle or stitch points as well as jump stitches. The embroidery machine either has a moveable needle or can control the underlying hooped material to move it according to the needle points. When reaching a jump stitch, a technician can then cut the thread so the embroidery machine can then move to the next needle point.

While using an embroidery machine file typically requires less skill to produce the embroidery design, generating the embroidery machine file is a cumbersome process. The embroidery machine file may have to be generated manually by a programmer defining the needle points. Other solutions have explored converting graphical images into an embroidery machine file, but digital graphical primitives (e.g., circles, squares, layers, etc.) are ill-suited to be converted into linear, needle point paths which make up typical embroidery designs.

SUMMARY

One embodiment described herein is a method that includes identifying a needle point path representing a plurality a stitches with locations on a 2D plane; displaying the needle point path on a touch screen; identify at least a portion of the needle point path to edit using the touch screen; converting the portion into a graphics region by identifying a bounding box that encapsulates the portion; performing an editing task on the graphics region; determining, after performing the editing task, stitch points by performing graphic interpolation on the graphics region; generating a new needle point path based on the stitch points.

Another embodiment described herein is a non-transitory computer-readable medium containing computer program code that, when executed by operation of one or more computer processors, performs an operation that includes identifying a needle point path representing a plurality a stitches with locations on a 2D plane; displaying the needle point path on a touch screen; identify at least a portion of the needle point path to edit using the touch screen; converting the portion into a graphics region by identifying a bounding box that encapsulates the portion; performing an editing task on the graphics region; determining, after performing the editing task, stitch points by performing graphic interpolation on the graphics region; generating a new needle point path based on the stitch points.

Another embodiment described herein is a system that includes one or more computer processors and a memory containing a program which when executed by the one or more computer processors performs an operation. The operation includes identifying a needle point path representing a plurality a stitches with locations on a 2D plane; displaying the needle point path on a touch screen; identify at least a portion of the needle point path to edit using the touch screen; converting the portion into a graphics region by identifying a bounding box that encapsulates the portion; performing an editing task on the graphics region; determining, after performing the editing task, stitch points by performing graphic interpolation on the graphics region; generating a new needle point path based on the stitch points.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 1 illustrates a user device for generating an embroidery machine file using a stylus, according to one embodiment.

FIGS. 4A-4C illustrate converting a raw path into a needle point path, according to one embodiment.

DETAILED DESCRIPTION

Figure 2:
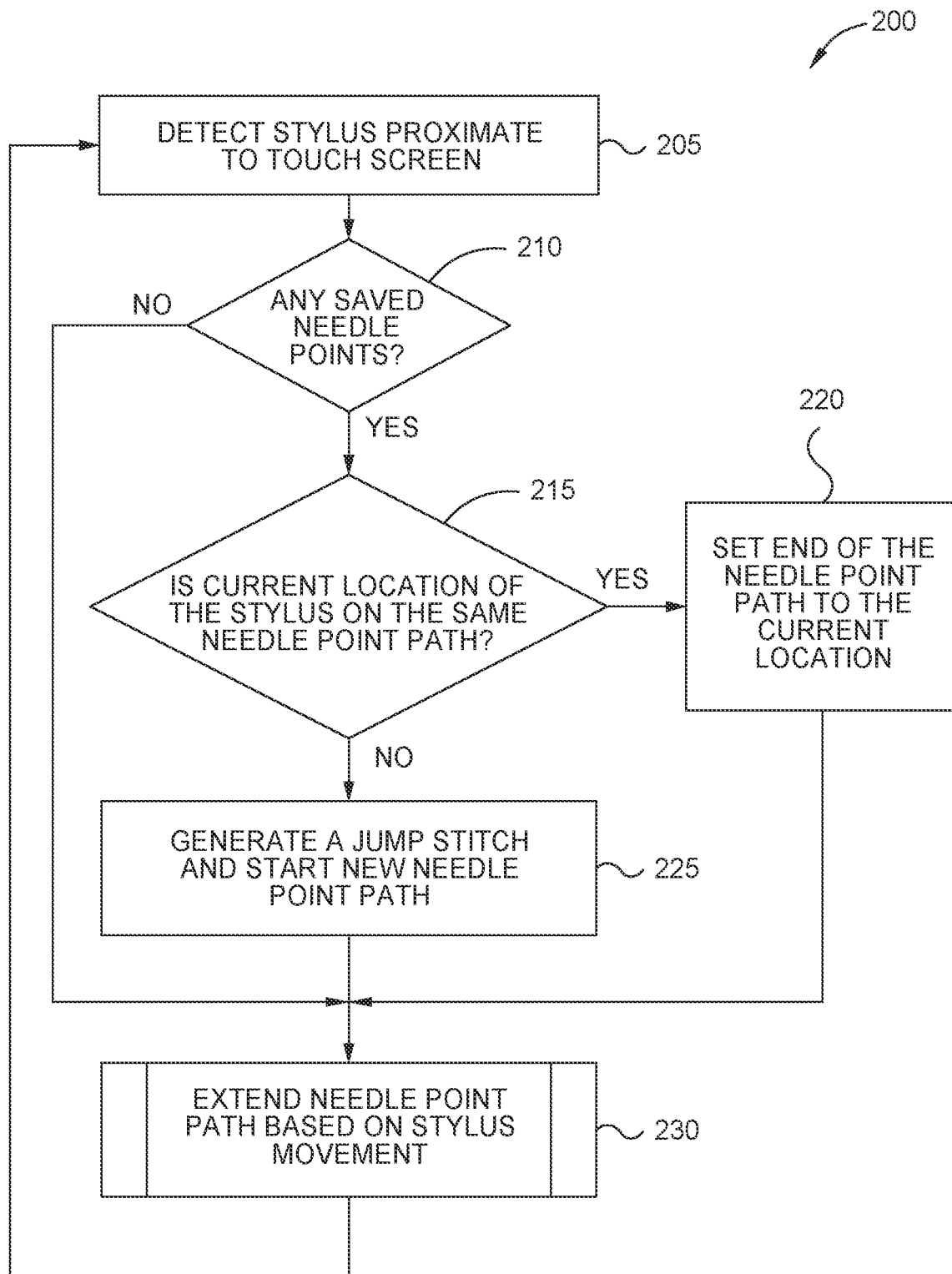
FIGS. 2 and 3 are flowcharts for converting the movement of a stylus into needle point paths, according to one embodiment.

Embodiments herein describe mapping user drawn lines into an embroidery machine file. For example, a user can use a stylus or her finger to draw an embroidery design on a touch screen of a user device (e.g., a smartphone, tablet, laptop, etc.). An embroidery application executing on the user device can convert the user movements into needle point paths (e.g., X/Y coordinates in a plane) and jump stitches (e.g., jumps between two different needle point paths). The application can then convert the needle point paths and jump stitches into the embroidery machine file. Advantageously, tracking user motion can lead to higher quality embroidery designs when compared to attempting to convert digital images into embroidery machine files. Further, tracking user motion can generate the embroidery machine files much faster than a programmer having to manually dictate the needle points and jump stitches.

Once a needle point path is created, the embodiments herein describe techniques for editing the path. For example, the stylus can be used to select a portion of the needle point path which can then be moved, rotated, shrunk/enlarged, deleted, replaced, copied, etc. Because needle point paths, which include X/Y coordinates and jump stiches, may not be compatible with software in an operating system used to manipulate graphics, the embodiments herein may first convert the selected portion of the needle point path into a graphics region which an operating system can then manipulate. Once edited, the path can then be added back to the needle point path.

FIG. 1 illustrates a user device 105 for generating an embroidery machine file 155 using a stylus 115, according to one embodiment. The left of FIG. 1 illustrates a user device 105 (e.g., a smart phone or tablet) where a user is currently using the stylus 115 to create a stitch path 170 in a touch screen 110. While the user device 105 is shown as a smartphone or tablet, the user device 105 can be a laptop or any other computing device with a touch screen 110. Further, in one embodiment, the user device 105 may be part of a kiosk that integrates an embroidery machine with the functions and components illustrated in FIG. 1. For example, a user may use a touch screen 110 at the kiosk to draw an embroidery design using the techniques discussed below, and then the embroidery machine at the kiosk can embroider the design on a fabric of the user's choice. Thus, the components shown in FIG. 1 can be integrated into a system that includes an embroidery machine.

The touch screen 110 enables the user device 105 to track the movement of the stylus 115. Using the embodiments described herein, the user device 105 can display the stitch path 170 along the path of the stylus 115. This stitch path 170 can appear visually like thread used to form the embroidery design. Thus, the user can see exactly what the embroidery design formed from the stitch path 170 (or multiple stitch paths) will appear like when formed on fabric or other material. However, it is not a requirement that the user device 105 display a stitch path 170 with the appearance of thread and stitches. In other embodiments, the user device 105 may trace out a simple line to indicate the embroidery design. Further, while a stylus 115 is shown, other input elements can be used to generate the stitch path 170 such as the user's finger or other input devices.

The right side of FIG. 1 illustrates various components in the user device 105. In this embodiment, the user device 105 includes the touch screen 110, a processor 120, and memory 125. The processor 120 represents any number of processing elements that can each include one or more processing cores. The memory 125 can include volatile memory elements, non-volatile memory elements, and combinations of both. Further, while the processor 120 and memory 125 are shown in the user device 105, some of the embodiments discussed herein can be performed on other computing devices, such as in a cloud computing environment or a data center.

The memory 125 includes a tracker 130 which may be an application executing in an operating system (OS) that tracks the movement of the stylus (or any other input element) along the touch screen 110. This tracking information can then be used by an embroidery application 135 to form the stitch path 170 which is then displayed on the touch screen 110.

The embroidery application 135 includes a point generator 140, a convertor 150, and an optimizer. The point generator 140 uses the tracking information provided by the tracker 130 to generate needle points 140. These needle points 140 can then be used to render the stitch path 170 on the touch screen 110. As discussed in more detail below, the point generator 140 can convert the path of the stylus 115 into a series of needle points 145. These needle points 145 can be used to form one or more needle point paths which define the embroidery design.

The convertor 150 uses the needle points 145 to generate an embroidery machine file 155. In addition, the embroidery application 135 can provide jump stitches to the convertor 150. With this information, the convertor 150 can generate the embroidery machine file 155 which provides instructions to an embroidery machine to generate the embroidery design. As an example, the converter 150 can use the needle points 145 and the jump stitches to generate an embroidery machine file 155 that instructs the embroidery machine to move to a first location along a plane, make a stitch, move to a second location along a plane, make a stitch, move to third location along the plane, make a stitch, and so forth until reaching a stopping point which can be a location where the technician needs to cut the thread so the machine can move to a different location (e.g., a jump stitch), change threads to a different color, or the embroidery is finished. The stitch locations and the stopping locations can correlate to the needle points 145 and the jump stitches.

An example of an embroidery machine file 155 is a Data Stitch Tajima® (DST) file format (Tajima® is a registered trademark of Tokai Industrial Sewing Machine CO., LTD.). However, this is just one example. Different embroidery machine manufactures often have their own proprietary file formats, but generally have the same common elements such as defining locations for the stitches as well as stopping locations for moving to a different location, changing thread, etc. Thus, the embodiments herein can be used with a variety of different embroidery machine formats to generate embroidery machine files.

The optimizer 160 can optimize the needle points 145 and the jump stitches before the convertor 150 generates the embroidery machine file 155. Often, when drawing the embroidery design using the stylus 115, the user will create needle point paths that, if directly converted into instructions for the embroidery machine file 155 may be inefficient. For example, assume the user draws a horizontal line, moves the stylus 115 to a different location of the touch screen 110, and draws a vertical line that then connects to the end of the horizontal line. If the embroidery machine file 155 instructs the embroidery machine to mimic the user's actions, the machine while stitch the horizontal line, reach a stopping point to permit the technician to cut the thread, moves to the beginning of the vertical line, and then stitches the vertical line to connect to the end of the horizontal line. Using the techniques described herein, the optimizer 160 can recognize the two lines can be combined into a single line. Instead of mimicking the user's actions, the optimized embroidery machine file 155 can instruct the embroidery machine to make the horizontal line and then immediately begin making the vertical line without a jump stitch. Details of optimizing the needle point paths is discussed in FIGS. 5-6.

FIG. 2 is a flowchart of a method 200 for converting the movement of a stylus into needle point paths, according to one embodiment. The method 200 assumes that the embroidery application is performing a new project where there is no current needle point list. However, the method 200 can also be used to add to an embroidery project that has already been created. In that example, an existing embroidery machine file can be converted into a needle point list. The embroidery application can then add needle points to this list using the method 200.

At block 205, the tracker (e.g., the tracker 130 in FIG. 1) detects a stylus proximate to the touch screen. While the method 200 describes tracking a stylus, any input element can be used such as a finger or other input device. Further, the tracker may track the stylus while it contacts or hovers above the touch screen. Thus, direct contact is not required in order to track the location of the stylus.

At block 210, the point generator (e.g., the point generator 140 in FIG. 1) determines whether there are any saved needle points. If this is the first time the user has begun to draw on the touch screen, then the point generator has not yet identified any needle points for the embroidery design. Put differently, the point generator has not yet created any needle points for this project. In that case, the method 200 proceeds to block 230 where the point generator 140 extends, or in this case, starts a needle point path based on stylus movement. The details of block 230 are discussed in FIG. 3.

In contrast, if the user has previously moved the stylus and the point generator has identified needle points for the embroidery design, the method 200 proceeds to block 215 where the point generator 140 determines whether the current location of the stylus is on the same needle point path. As the user moves the stylus, the point generator creates needle points that define the needle point path. In one embodiment, so long as the user does not lift up the stylus and place it at a different location on the touch screen, the point generator determines at block 215 that the current location of the stylus is on the same needle point path (e.g., the location of the stylus is at, or near, the end of the needle point path). Or if the user has opened a previously saved embroidery design, the point generator determines whether the current location is at (or near) the end of a needle point path that was already part of the embroidery design.

If the stylus is on the same needle point path, the method 200 proceeds to block 220 where the point generator sets the end of the needle point path to the current location of the stylus. That is, the movement of the stylus to its current location is added as the end point of the needle point path. However, the needle point path does not have needle points that extend to the new end of the path (i.e., the current location of the stylus). Thus, the method 200 then proceeds to block 230 where the point generator extends the needle point path to the end point. That is, the point generator adds additional needle points so that the needle point path extends to the current location of the stylus. The method 200 can be repeated at intervals (e.g., every time the tracker identifies the stylus has moved on the touch screen, or at predefined time intervals) to extend the needle point path.

Returning to block 215, if the point generator determines that stylus is not on the same needle point (e.g., the user has picked up and moved the stylus to a different location on the touch screen), the method 200 proceeds to block 225 where the point generator generates a jump stitch and starts a new needle point path. For example, the embroidery design may include multiple needle point paths that are connected by jump stitches. Thus, the method 200 can be repeated to extend a needle point path as well as create new needle point paths.

Figure 3:
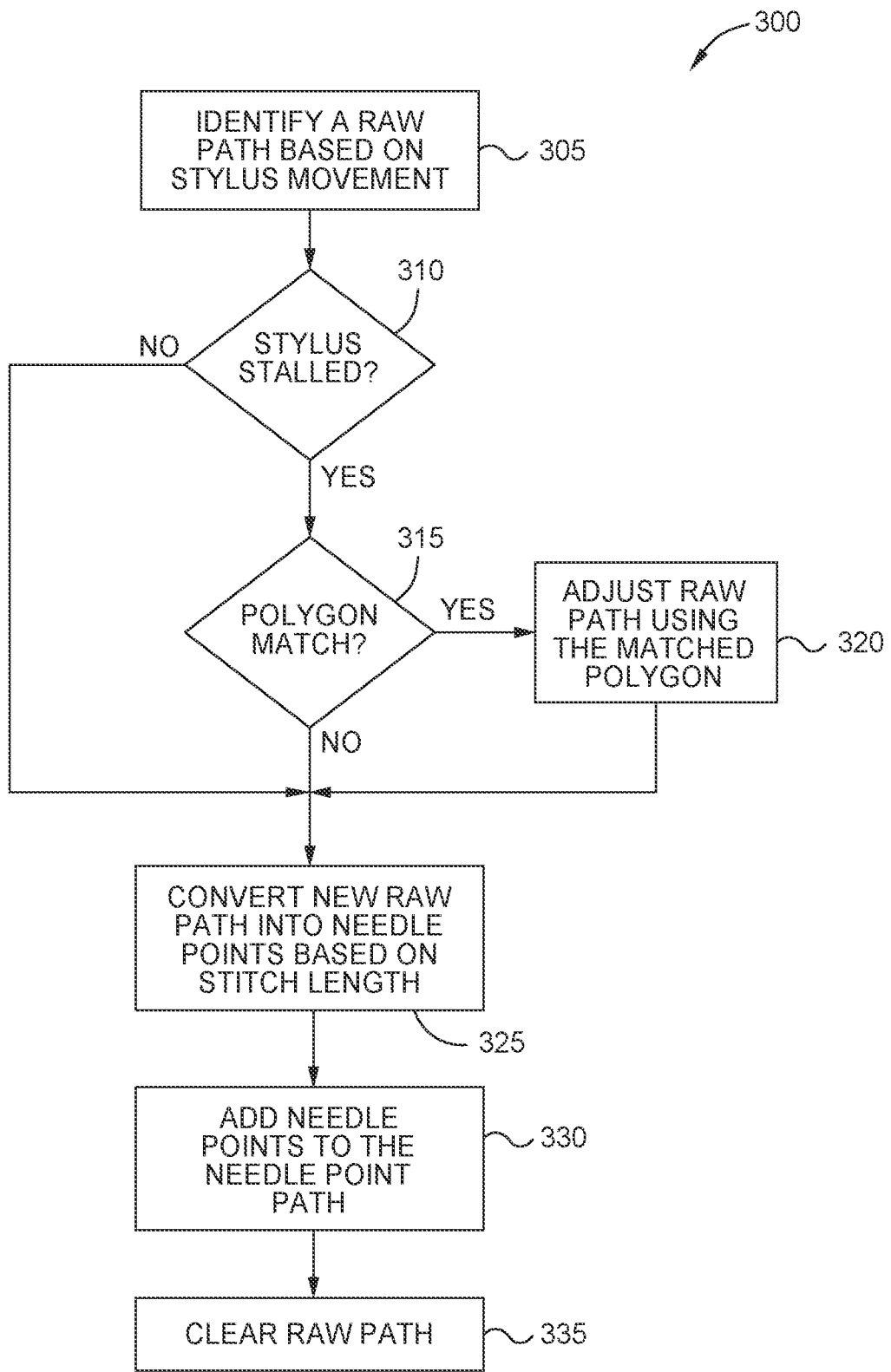

FIG. 3 is a flowchart of a method 300 for converting the movement of a stylus into needle point paths, according to one embodiment. The method 300 is called at block 230 of FIG. 2 where the user is extending a current needle point path or is starting a new needle point path based on the user moving the stylus to a new location (or starting a new embroidery design).

At block 305, the tracker identifies a raw path based on the movement of the stylus. That is, the tracker identifies a path traveled by the stylus. The tracker may use any technique for identifying the raw path such as listing points (e.g., locations on the touch screen) to indicate the path the stylus moved since the last time the point generator updated the needle point path. The method 300 can then be used to convert this raw path (which was identified by the tracker) into needle points that can be added to the needle point path.

At block 310, the point generator determines whether the stylus has stalled. The user may stop moving the stylus for many reasons, such as evaluating what she has drawn already, or to take a break. In this embodiment, the user can also stop moving the stylus to indicate she has completed a polygon (i.e., a predefined geometric shape) such as a line, circle, ellipse, rectangle, triangle, etc. For example, when drawing a polygon, the user may pause (e.g., stall) which tells the point generator to evaluate the raw path and the needle point path to determine whether the user has drawn a polygon.

Many operating systems have polygon recognition techniques for evaluating lines drawn by the user to determine whether they match a predefined polygon. The point generator can wait for the user to pause and then call a polygon recognition technique to determine whether the path drawn by the user (e.g., the raw path, or a combination of the raw path and the needle point path) matches a polygon. For example, at block 315, the point generator can use a polygon recognition technique to determine whether the path drawn by the user matches a polygon. If so, the method 300 proceeds to block 320 where the point generator adjusts the raw path using the matched polygon. For example, the point generator or the tracker can adjust the points used to form the raw path so they form the shape of the polygon. As an example, the user may draw a path that forms a square, but the user most likely will not draw perfectly straight sides, or perfect ninety degree corners. However, once the polygon recognition technique determines the user intended to draw a square, the point generator can adjust the raw path (and the points in the needle point path) so it forms a perfect square. In this manner, the user can hand draw paths that approximate ideal polygons. The user drawn path can then be replaced by an adjusted path that matches the polygon.

One advantage of using polygon matching to adjust the raw path and needle point path is that it avoids using digital image primitives to generate the embroidery machine file. As discussed in the background section, it is difficult if not impossible to convert digital image primitives into linear, needle point paths which make up typical embroidery designs. The methods 200 and 300 avoid using digital image primitives and instead use polygon matching to adjust hand drawn paths. That is, instead of the user starting with digital image primitives (e.g., squares, layers, circles) to create the design, they first hand drawn the design. Although this introduces inaccuracies into the design since humans cannot typically hand draw perfect polygons, a polygon matching technique can be used to adjust the hand drawn path to mimic a perfect polygon, again without using digital image primitives.

After performing polygon matching (or if at block 310 the stylus was not stalled, or at block 315 there are no matching polygons), the method proceeds to block 325 where the point generator converts the raw path into needle points based on a stitch length. The stitch length can define a minimum spacing between the needle points (or stitches) forming the needle point path. Alternatively, the needle points can be set based on the speed of the stylus when traveling along the raw path. For example, some techniques may space the needle points closer together the slower the stylus moves, while spreading the needle points farther apart as the stylus increases speed. However, the user may move the stylus slowly because she is at a particular tough part of the design or because she is being careful rather than intending to create a cluster of needle points at a particular portion of the path. By using a predefined stitch length, the placement of the needle points can be decoupled from the speed of the stylus, and thus, avoid having too many, or too few needle points along a portion of the path.

At block 330, the point generator adds the needle points formed from the raw path to the needle point path. That is, the end of the needle point path may intersect with the beginning of the raw path. Thus, the needle points from the raw path can be used to extend the needle point path.

In one embodiment, the point generator may maintain a data structure that includes the needle points forming the needle point path. After converting a raw path into needle points, the locations of these needle points can be added to the data structure or the needle point path.

At block 335, the point generator or tracker clears the raw data path. The method 300 can then return to method 200 where the tracker continues to track the location of the stylus on the touch screen where the method 200 can repeat and call the method 300 to extend a current needle point path or add a new needle point path.

FIGS. 4A-4C illustrate converting a raw path into a needle point path, according to one embodiment. That is, FIGS. 4A-4C illustrate one example of blocks 305-330 of the method 300 where a raw data path is converted into needle points that are then added to an existing needle point path.

FIG. 4A illustrates a needle point path 405 defined by a series of needle points 410 and a raw path 415 that were formed by the movements of the stylus 115. That is, both the needle point path 405 and the raw path 415 illustrate previous locations of the stylus 115 as it moved along the touch screen (without being lifted up). However, the needle point path 405 illustrates a portion of the path of the stylus 115 that has already been converted into needle points 410 using the methods 200 and 300 discussed above. In contrast, the raw path 415 illustrates a portion of the path of the stylus 115 which has been identified by the tracker but has not yet been converted into needle points 410 using the method 300.

In FIG. 4A, it is assumed that the stylus 115 is stalled at its current location. As discussed in the method 300, this can trigger the point generator to call a polygon recognition technique to determine whether the raw path 415 matches a predefined polygon. In this embodiment, the point generator evaluates only the raw path because the needle point path 405 may have already been matched to a polygon. However, in other examples, the polygon matching technique may also use consider the needle point path 405 when determining whether the raw path 415 matches a predefined polygon.

As shown, the raw path 415 includes curves, but the polygon matching technique may determine those curves are within a tolerance or variance indicating that the user intended to draw a straight line. Put differently, the polygon matching technique determines the curves where unintentional and the raw path 415 matches a straight line (i.e., the raw path is substantially similar to a straight line).

FIG. 4B illustrates the point generator generating an adjusted raw path 420 so the path 420 now matches the polygon (i.e., the straight line). In one embodiment, the polygon matching technique considers the shape of the needle point path 405 when determining to adjust the raw path. For example, because the needle point path 405 is a straight line, this may influence the decision by the polygon matching technique whether the user intended to draw the raw path 415 as a straight line.

FIG. 4C illustrates converting the adjusted raw path 420 into needle points 410. These needle points 410 are then added or appended into the needle point path 425. In one embodiment, the adjusted raw path 420 is converted into needle points 410 using a defined stitch length so that the spacing between the needle points 410 are equidistant. However, different geometric shapes may use different spacing such that the spacing between the needle points is not the same. For example, to make a corner of a square, the point generator may place a needle point at the corner, even if that violates the stitch length (e.g., the needle point at the corner is closer to a neighboring needle point than the stitch length).

Further, the user may desire to set the spacing of the needle points 410 based on the speed of the stylus rather than using a stitch length. For example, the embroidery application may provide an option for the user to select whether to use the speed of the stylus or the stitch length to set the spacing between the needle points 410.

In addition, the embroidery application can provide other options to the user such as an undo feature (e.g., a backup feature) and a restore feature. For example, assume that the user did not intend for the raw path 415 to be a straight line, but rather wanted it to remain curved. The user can touch, click, or press a button that instructs the embroidery application to undo the last action it took (e.g., adjusting the raw path 415 to form the adjusted raw path 420). Moreover, if the user drew the raw path 415 in the wrong location, she can use the undo feature to discard the raw path 415. The user can then move the stylus 115 to the end of the needle point path 405 in FIG. 4A and redraw a raw path in the desired location or with a desired shape.

When undoing an action, the embroidery application can store that action in a history. Thus, if the user changes her mind, she can touch, click, or press a button that restores the action using the history. In this manner, as the user undoes multiple actions, she can also restore those actions using the history (e.g., redraw the raw path 415 or readjust the raw path 415 to form the adjusted raw path 420 based on polygon matching). In one embodiment, once the user performs a new action, the actions stored in the history are cleared.

Figure 5:
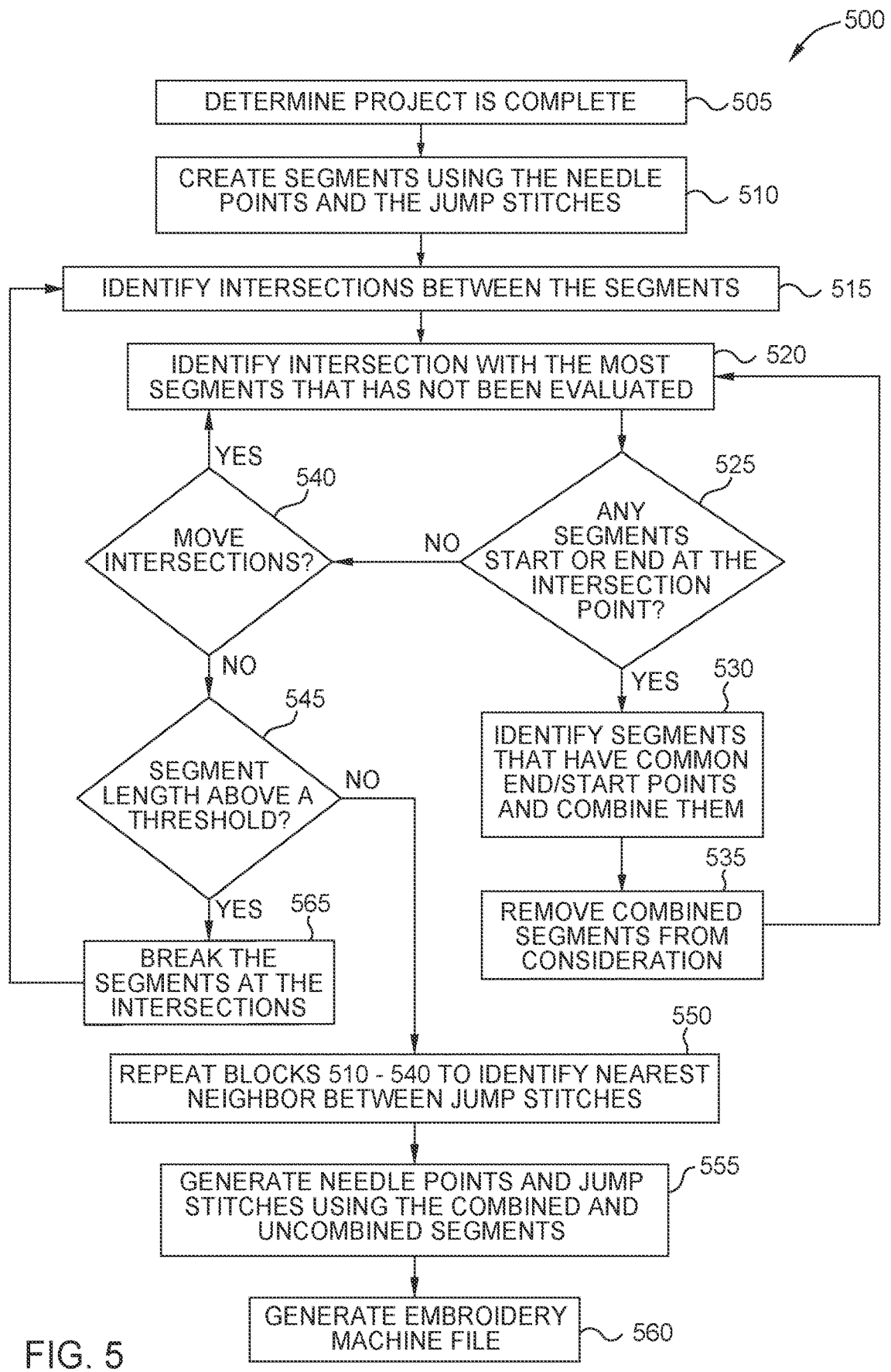
FIG. 5 is a flowchart for optimizing needle point paths, according to one embodiment.

FIG. 5 is a flowchart of a method 500 for optimizing needle point paths, according to one embodiment. Once the user is done with an embroidery design, the user can be presented with an option to optimize the design before the embroidery application converts the needle point path(s) and jump stitch(es) into an embroidery machine file. For example, when drawing the needle point paths, the user may not have used optimal paths which would reduce the number of jump stitches, and thus, reduce the number of times a technician has to cut the thread so the embroidery machine can resume the design at a different location. The method 500 can be used to combine the needle paths to reduce the number of different needle point paths, and thus, the number of jump stitches in the embroidery design. Further, the method 500 can identify the nearest segments to reduce the distances between each of the jump stitches, which can further reduce the time required to produce the embroidery design.

At block 505, the optimizer (e.g., the optimizer 160 in FIG. 1) determines a project is complete and the user has instructed the embroidery application to optimize the design.

At block 510, the optimizer creates segments using the needle points and the jump stitches. That is, the different needle point paths created using the methods 200 and 300 can be temporary converted into segments which can be lines or shapes. The different jump stitches can be used to identify the different segments.

At block 515, the optimizer identifies intersections between the segments. That is, the optimizer can identify each location where a two segments intersect (e.g., have a point in common).

At block 520, the optimizer identifies the intersection with the most segments running through it, which has not yet been evaluated. That is, each intersection can define a point where two, three, four, or more segments meet. If this if the first iteration of the method 500, then at block 520, the optimizer selects the intersection with the most segments that meet at that point.

At block 525, the optimizer determines whether any of the segments corresponding to the intersection start or end at the intersection point. That is, some of the segments may cross through the intersection while other segments may start or end at the intersection point.

Assuming at least one segment starts or ends at the intersection, the method proceeds to block 530 where the optimizer identifies segments that have common end and starts points and combines them. In one embodiment, the optimizer selects one of the segments that starts or ends at the intersection point and determines whether there are any other segments that have a common end or start point with that segment. If so, the segments are combined and the optimizer can determine if there are any other segments that have common start or end points of the combined segment, and if so, combine them. This search can continue until there are no other segments that meet this criterion. The optimizer can continue to evaluate other segments that start or end at the intersection point to see if those segments can be combined with other segments.

At block 535, the optimizer removes from consideration the segments that were combined at block 530. The method 500 then returns to block 520 to identify the intersection with the second most segments that meet or cross at its location.

If at block 525 an intersection does not have any segments that end or start at its location, the method proceeds to block 540 where the optimizer determines whether there are any other intersections identified at block 515 that have not yet been evaluated. If so, the method returns to block 520 to evaluate those intersections.

Assuming all the intersections have been evaluated, the method 500 proceeds to block 545 where the optimizer determines whether a segment length is above a threshold. That is, the optimizer can evaluate the current lengths of the segments and determine if any are above the threshold. If so, the method 500 proceeds to block 565 where the optimizer breaks the segments at the intersections to form smaller segments. The method 500 then returns to block 515 to identify a new set of intersections using the smaller segments and repeats the above mentioned blocks.

After returning to block 545, if the segments length is less than the threshold, this indicates the segments should not be divided anymore. The optimizer has found all the segments it can combine in order to reduce the number of jump stitches.

The method 500 then proceeds to block 550 to repeat blocks 510-540 to identify the nearest neighbor for the jump stitches. That is, the method 500 can also identify the nearest neighbor between the start and end points of the combined segments. Identifying the closest neighbors can then be used to optimize the order in which the segments should be performed based on which segments have jump stitches closest to each other.

At block 555, the converter (e.g., the converter 150 in FIG. 1) generates needle points and jump stitches using the combined segments and uncombined segments.

At block 560, the converter generates an embroidery machine file using the needle points and the jump stitches identified at block 550. The embroidery machine file can list a series of instructions that, when executed on an embroidery machine, cause the machine to make the needle points in a material (e.g., fabric). Further, the embroidery machine file can have stop instructions corresponding to the jump stitches so a technician can cut the thread so the embroidery machine can resume forming the design at a different location. However, while current machines cannot stop the embroidery design in one location and resume the design in another location without human assistance, further embroidery machines may have this function. In that case, the embodiments herein can still be used to generate the embroidery machine file but instead of using the jump stitches to form stop instructions, the jump stitches can be used to instruct the machine to automatically stop the embroidery design in one location and resume the design in another location.

Figure 6A:
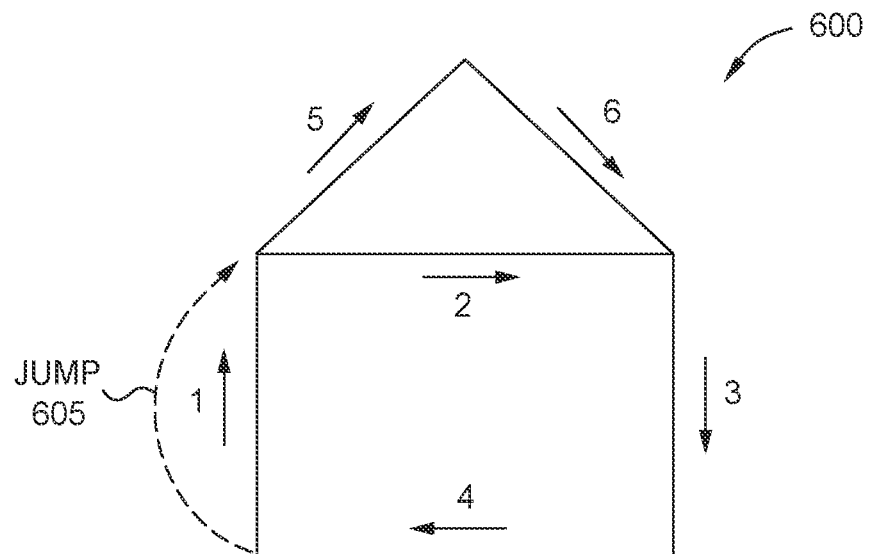
FIGS. 6A and 6B illustrate optimizing needle point paths, according to one embodiment.
Figure 6B:
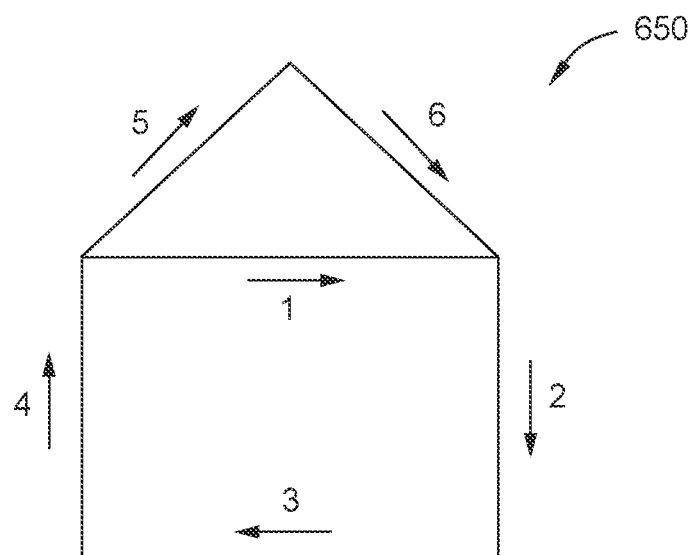

FIGS. 6A and 6B illustrate optimizing needle point paths, according to one embodiment. FIG. 6A illustrates non-optimized paths 600 formed by a user on a touch screen for an embroidery design while FIG. 6B illustrates an optimized path 650 after performing the optimization method 500 in FIG. 5.

FIG. 6A includes six line segments that are drawn in the order shown by the user (Line Segment 1 is drawn first, Line Segment 2 is drawn second, and so forth). The Line Segments 1-4 are drawn without the user lifting the stylus from the touch screen. However, to make Line Segments 5 and 6, the user lifts the stylus from the touch screen after completing Line Segment 4 and then traces the Line Segments 5 and 6. This lifting of the stylus is illustrated by the jump 605. As discussed above in the method 200, the embroidery application can record this jump as a jump stitch at block 225. Thus, the embroidery application would store two needle paths: one formed from the Line Segments 1-4 and another formed from the Line Segments 5 and 6 with the jump stitch between the end of Line Segment 4 and the beginning of the Line Segment 5.

FIG. 6B illustrates the result of performing the method 500. In this case, the Line Segments 1-4 have been combined with the Line Segments 5-6 which creates one needle path and removes the need for the jump stitch. That is, instead of starting the first needle point path at the bottom left corner of the square, the path now starts in the upper left corner of the square (but could also start in the upper right corner). The needle path then proceeds according to the order shown from Line Segments 1-6 without any need to jump from one location to a different location. Thus, when the converter generates an embroidery machine file using the optimized needle path 650, the embroidery machine can complete the entire design without have to stop and wait for a technician to cut the thread (e.g., without performing a jump stitch). Thus, FIGS. 6A and 6B illustrate one example where the method 500 can be used to optimize the needle point paths and jump stitches generated by the user to form optimized needle point paths and jump stitches.

Editing a Needle Point Path

Figure 7:
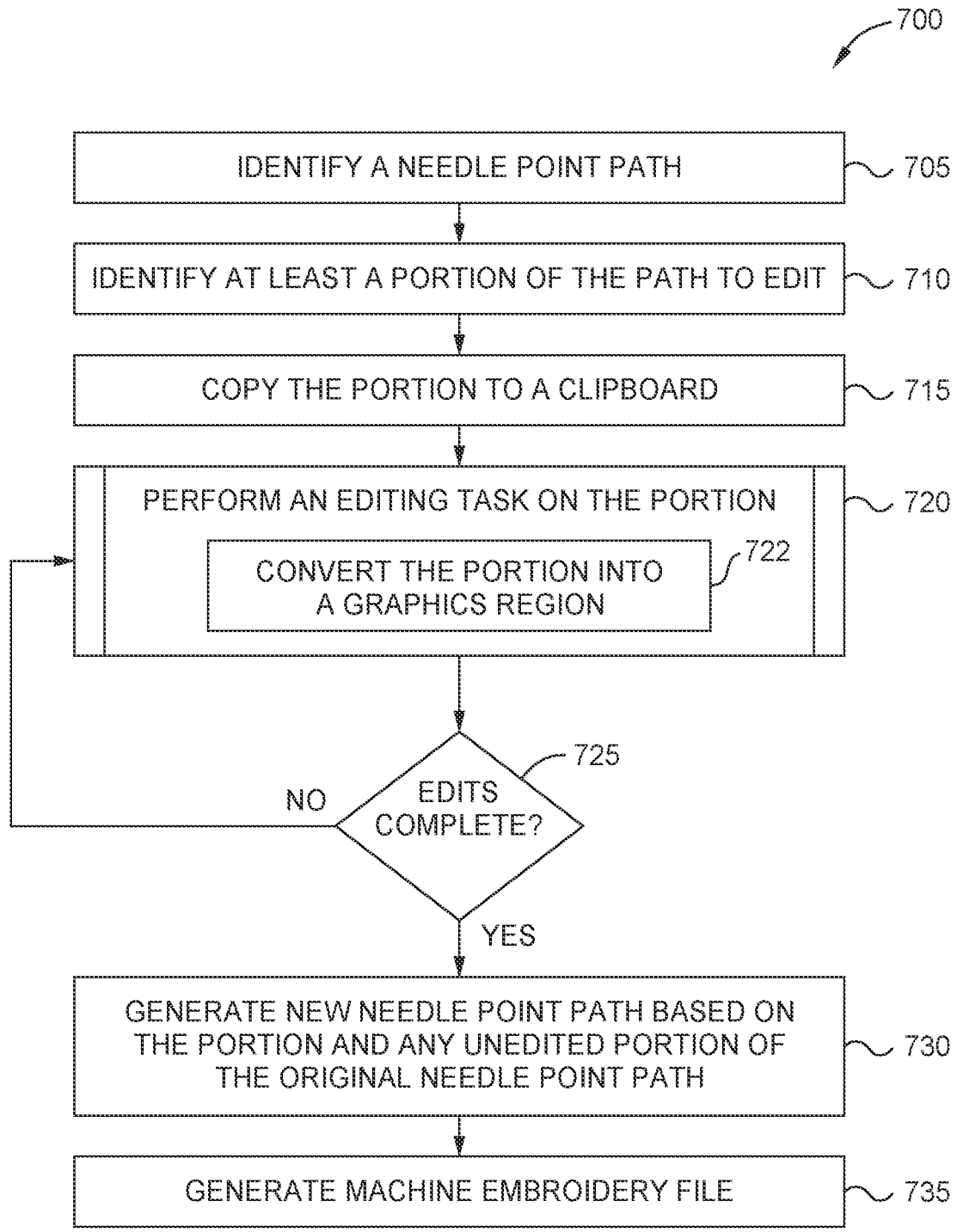
FIG. 7 is a flowchart for editing a needle point path, according to one embodiment.

FIG. 7 is a flowchart of method 700 for editing a needle point path, according to one embodiment. At block 705, the embroidery application (e.g., the embroidery application 135 in FIG. 1) identifies a needle point path. In one embodiment, the user has already used an input element (e.g., a stylus or finger) to draw the needle point path on the user device as described above. However, in another embodiment, the user selects a stored needle point, which is then displayed. In yet another embodiment, the user selects a machine embroidery file to load as the needle point path. However, this file may first be converted into a needle point path. This is discussed in FIG. 14 below.

As discussed above, the needle point path includes X/Y coordinates in a 2D plane corresponding to individual stitches which are separated by a stitch length. The path can also include jump stitches to other needle point paths. In one embodiment, the needle point path is associated with a data structure that provides a name of the path, the defined stitch length, and thread information such as color, manufacture's ID, thread weight, availability of the thread, and the like. For example, this data structure may be created when a drawn needle point path is saved to memory in the user device.

At block 710, the embroidery application identifies at least a portion of the path to edit. In one embodiment, using an input element, the user can select some, or all, of the needle point path to edit. For example, the user may wish to edit only the beginning portion of the path, or only a middle portion, or only the end portion. Alternatively, the user may wish to edit the entire path. Using a stylus, the user can select a portion of the needle path that she wishes to edit.

Figure 8A:
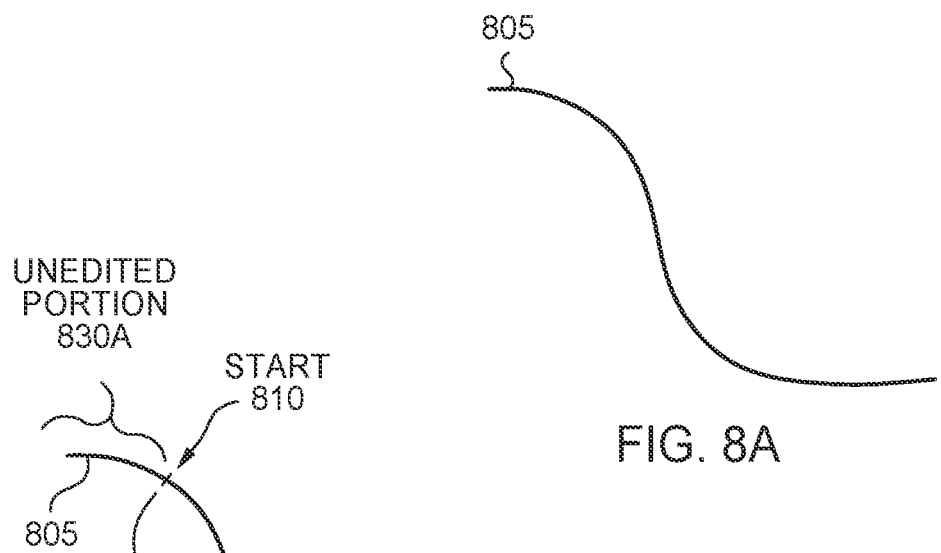
FIGS. 8A-8C illustrate selecting a portion of a needle point path to edit, according to one embodiment.
Figure 8B:
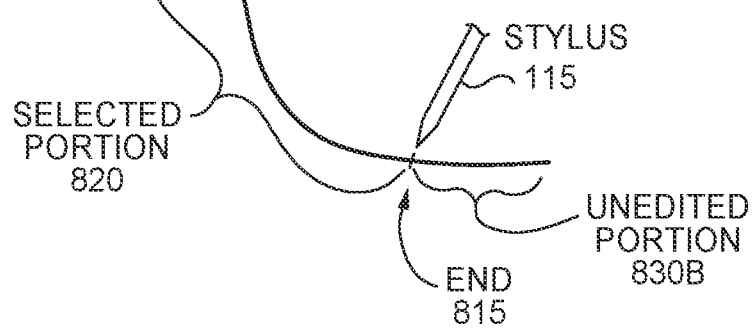
Figure 8C:
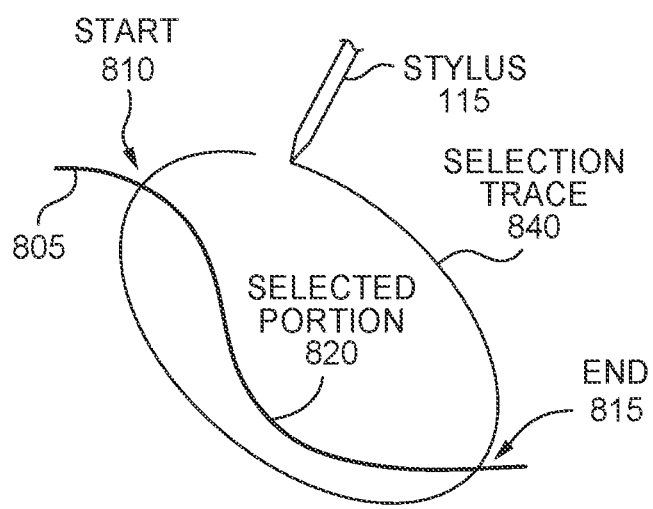

FIGS. 8A-8C illustrate selecting a portion of a needle point path to edit, according to one embodiment. That is, FIGS. 8A-8C illustrate different techniques that a user can use to identify a portion of the needle point path for editing, as discussed at block 710 of FIG. 7.

FIG. 8A illustrates a needle point path 805 which is being displayed on the touch screen of the user device. For clarity, the needle point path 805 is shown as a line, but in other embodiments, the path 805 may look like actual thread that has been stitched into a fabric. In this example, the user wishes to edit only a portion of the path 805 while the remaining portion(s) of the path 805 remain unedited.

FIG. 8B illustrates using the stylus 115 to select a start 810 and an end 815 of a selected portion 820 of the needle point path 805. That is, the user can make slashes or small lines that intersect the needle point path where these slashes indicate to the embroidery application the start 810 and end 815 of the portion of the path 805 the user wishes to edit. As such, the portion of the needle point path between the start 810 and the end 815 is labeled as the selected portion 820 while the remaining portions of the path 805 are labeled as unedited portions 830A and 830B since these portions are not edited during the tasks described below. Put differently, when performing editing tasks, the user cannot change the location or orientation of the unedited portions 830A and 830B. Instead, only the selected portion 820 can be edited by the user.

FIG. 8C illustrates using a different technique to select a portion of the needle point path 805 to edit. In this example, the user moves the stylus to create a selection trace 840 that intersects the needle point path 805 at two locations which serve as the start 810 and the end 815 of the selected portion 820. Thus, the selection trace 840 can be used to identify the selected portion 820, similar to the two slashes shown in FIG. 8B.

The techniques in FIGS. 8B and 8C are non-limiting examples of selecting a portion of the needle point path to edit. In another example, the user may set the start and end points by touching the path 805 at two points. Further, the needle point path can have other shapes besides a line. For example, the needle point path may be a complex design such as a rabbit or a house (e.g., the needle point path in FIG. 6B). In those examples, it may be easier to use the technique in FIG. 8C to select a portion of the needle point path to edit since the selected portion may include multiple lines. The user can draw the selection trace 840 through the portion of the design she wants to edit, which may intersect multiple different lines in the needle point path.

Returning to the method 700, at block 710 the embroidery application copies the portion to a clipboard. As discussed in more detail below, adding the selected portion to the clipboard enables certain editing features such as pasting the portion somewhere else in the design or saving the portion for later use.

At block 720, the embroidery application performs an editing task on the selected portion. This task can include moving, rotating, shrinking, enlarging, deleting, or replacing the selected portion. However, it may be difficult for the embroidery application to directly manipulate (e.g., edit) a portion of the needle point path. As mentioned above, the needle point path is a collection of X/Y coordinates indicating the needle points along with jump stitches.

At block 722, the embroidery application converts the portion into a graphics region. In one embodiment, the selected portion is converted into digital graphical primitives (e.g., circles, squares, lines, etc.) which then can be easily manipulated by the operating system of the user device. That is, a user device with a touch screen includes software for manipulating a graphics region containing a digital image. By converting the selected portion of the needle point path into a graphics region, the embroidery application can leverage the software in the operating system to perform the editing task. Once the task is complete, the embroidery application can replot the selected portion as a needle point path. This process is discussed in more detail in FIG. 9.

At block 725, the embroidery application determines whether the user has completed editing the selected portion. For example, the user may press or touch a button to indicate she is finished editing the selected portion. If not, the method 700 returns to perform a different editing tasks as instructed by the user. For example, the user may first resize the selected portion before then rotating the portion by 30 degrees.

Once done editing the selected portion, the method 700 proceeds to block 730 where the embroidery application generates a new needle point path based on the edited portion and any unedited portion of the original needle point path. That is, the embroidery application can generate a new needle point path that now has the edited portion as well as any unedited portions (e.g., the unedited portions 830A and 830B in FIG. 8B). The details of generating the new needle point path are also discussed in more detail below.

At block 735, the embroidery application generates a machine embroidery file using the new needle point path. In one embodiment, as part of generating the embroidery file, the embroidery application can perform the optimization techniques discussed above in FIG. 5. However, these optimization techniques are optional. In any case, the embroidery application generates the embroidery machine file using the needle points and the jump stitches in the new needle point path. The embroidery machine file can list a series of instructions that, when executed on an embroidery machine, cause the machine to make the needle points in a material (e.g., fabric). Further, the embroidery machine file can have stop instructions corresponding to the jump stitches so a technician can cut the thread so the embroidery machine can resume forming the design at a different location.

Figure 9:
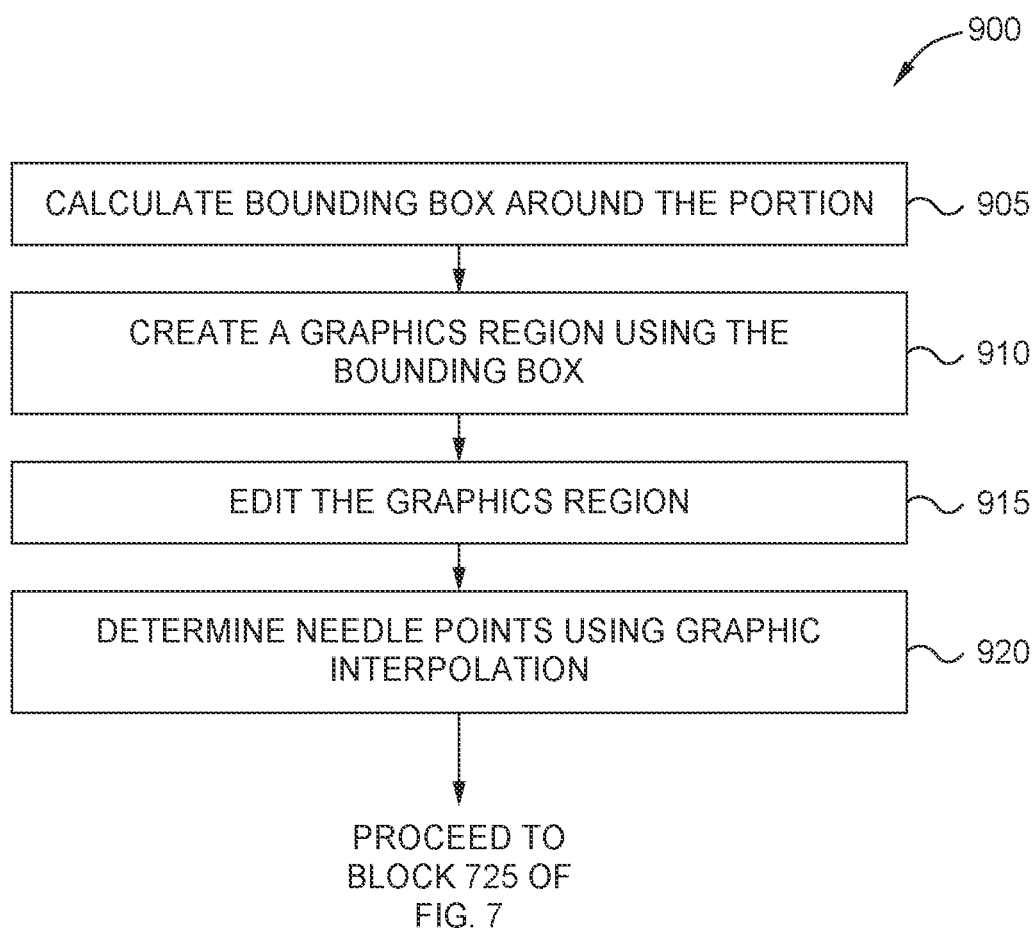
FIG. 9 is a flowchart for editing a selected portion of a needle point path, according to one embodiment.

FIG. 9 is a flowchart of a method 900 for editing a selected portion of a needle point path, according to one embodiment. In one embodiment, the method 900 illustrates further techniques for performing an editing task on a selected portion as discussed at block 720 of the method 700. Put differently, the method 900 illustrates one example of performing an editing task on a selected portion of a needle point path. Thus, the method 900 assumes that the embroidery application has already identified a selected portion of the path based on user input.

Figure 10A:
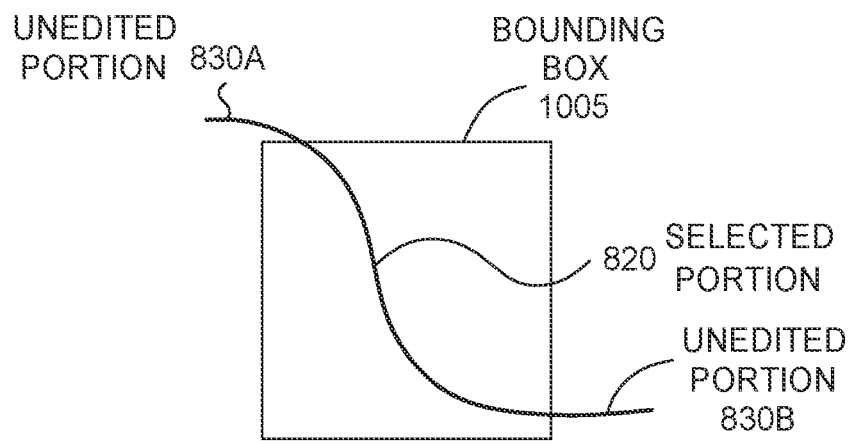
FIGS. 10A-10C illustrate using a bounding box to edit a selected portion of a needle point path, according to one embodiment.
Figure 10B:
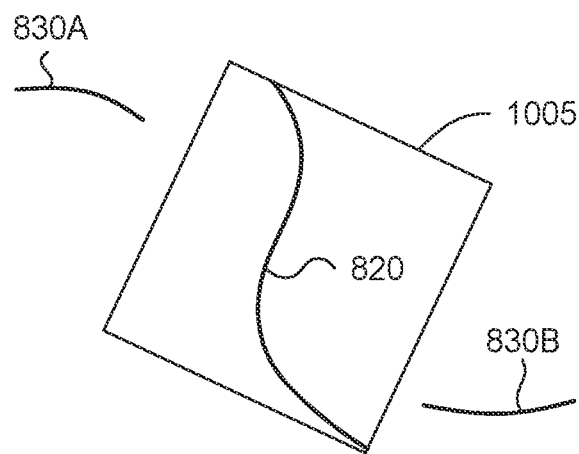
Figure 10C:
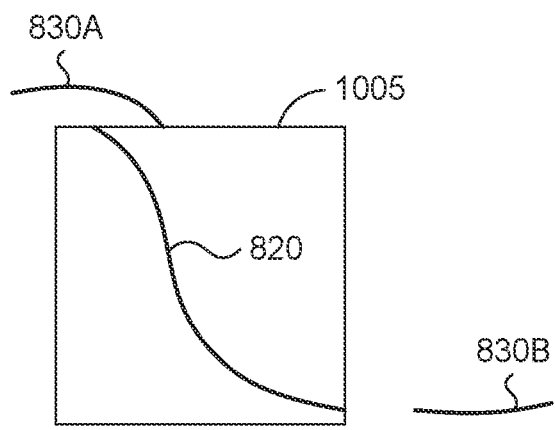

For clarity, the method 900 is discussed in tandem with FIGS. 10A-10C which illustrate using a bounding box to edit a selected portion of a needle point path, according to one embodiment. At block 905, the embroidery application calculates a bounding box around the selected portion of the needle point path. This is shown visually in FIG. 10A where a bounding box 1005 encapsulates the selected portion 820 of the needle point path shown in FIG. 8A. Notably, the bounding box 1005 does not include the unedited portions 830A and 830B of the needle point path. For example, the embroidery application may use the start and end of the selected portion 820 (as shown in FIGS. 8B and 8C) to determine the location of the bounding box 1005 so it encapsulates the selected portion 820.

In one embodiment, the user device displays the bounding box 1005. That is, once the selected portion 820 is identified, the display outputs the bounding box 1005 which is visible to the user. The user can then interact with the bounding box 1005 to edit the selected portion 820 as described below. However, in another embodiment, the bounding box 1005 may be invisible to the user. That is, the bounding box 1005 may be a construct used by the user device to track and manipulate the selected portion 820 without the user ever knowing the bounding box 1005 exists.

At block 910, the embroidery application (or the operating system in the user device) creates a graphics region using the bounding box 1005. As mentioned above, a needle point path may be a data construct that is difficult for the operating system to edit, given it is not a graphical construct (i.e., is not formed from digital graphical primitive (e.g., circles, squares, lines, layers, etc.). However, the bounding box 1005 can be converted into a graphics region that then can be manipulated and edited by the operating system using standard graphical editing techniques. Thus, encapsulating the selected portion of a needle point path by a bounding box and creating a graphics region using that box is one technique for converting the selected portion into a graphics region which can be manipulated using standard graphical editing techniques.

At block 915, the operating system edits the graphics region based on user input. That is, the operating system can use standard editing technique to move, rotate, shrink, enlarge, delete, or replace the graphics region which inherently performs the same action on the selected portion of the needle point path.

FIG. 10B illustrates rotating the bounding box 1005 (which has been used to create a graphics region). For example, the stylus (or a button on the graphical user interface (GUI) displaying the needle point path) can be used to rotate the bounding box 1005 and the selected portion 820 relative to their initial positions shown in FIG. 10A. Notable, the portions of the needle point path not in the bounding box 1005 (i.e., the unedited portions 830A and 830B) have not changed related to their location and size in FIG. 10A.

FIG. 10C illustrates moving the graphics region including the bounding box 1005. In this example, the user has shifted the bounding box 1005 and the selected portion 820 to the left relative to their locations in FIG. 10A. Again, performing this editing task does not affect the unedited portions 830A and 830B.

FIGS. 10B and 10C are just two example editing tasks that can be performed. An operating system can also shrink or enlarge the graphics region containing the bounding box 1005 and the selected portion, delete the graphics region, or perform a combination of editing actions (e.g., shrinking and then moving the graphics region).

At block 920, the embroidery application determines the needle points using graphic interpolation. In one embodiment, the operating system performs graphic interpolation to identify the new position and/or size of the selected portion in the graphics region. That is, graphic interpolation can identify how the selected portion was changed when the graphics region was edited at block 915. With this information, the embroidery application can identify needle points that correspond to the edited selected portion. That is, the embroidery application can identify the needle points (using the predefined stitch distance) that match the edited selected portions 820 shown in FIG. 10B or 10C.

Further, because the selected portions 820 in FIGS. 10B and 10C have been disconnected from the unedited portions 830A and 830B as a result of the editing task, the needle point path can include jump stitches to link the end of the unedited portion 830A to the left end of the selected portion 820 and the right end of the selected portion 820 to the end of the unedited portion 830B. These needle points and jump stitches can then be used by the embroidery application to generate the new needle point path as described at block 730 of FIG. 7.

In this manner, FIG. 9 illustrates a method 900 where a portion of a needle point path can be disposed in a graphics region so that region can then be manipulated using graphical editing techniques, thereby editing the portion of the needle point path. Updated needle points can then be identified from the edited portion using graphic interpolation and these needle points can be used to generate the new needle point path.

Figure 11:
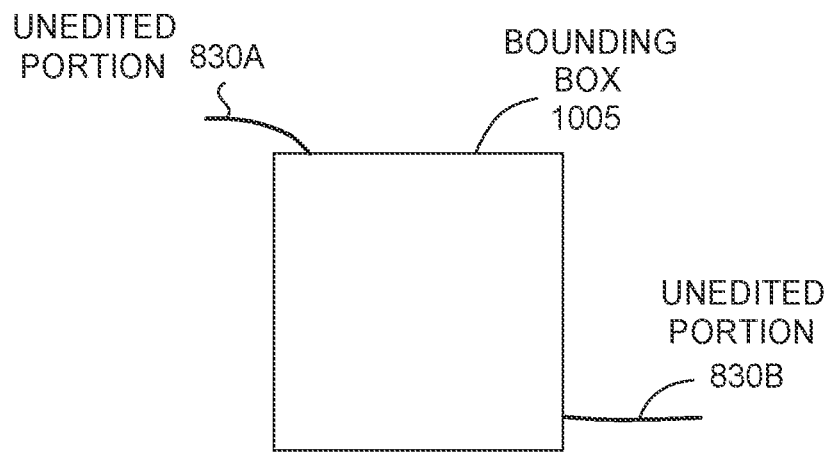
FIG. 11 illustrates deleting a selected portion of a needle point path, according to one embodiment.

FIG. 11 illustrates deleting a selected portion of a needle point path, according to one embodiment. FIG. 11 assumes that the user has already selected a portion of the needle point path and the embroidery application has created the bounding box 1005 around the selected portion. Further, as discussed in method 900, the bounding box 1005 may be used to create a graphics region.

The operating system (or other software on the user device) can then delete the selected portion (e.g., the selected portion 820 in FIG. 10A) in the bounding box 1005. Thus, the needle point path now includes only the unedited portions 830A and 830B.

Figure 12A:
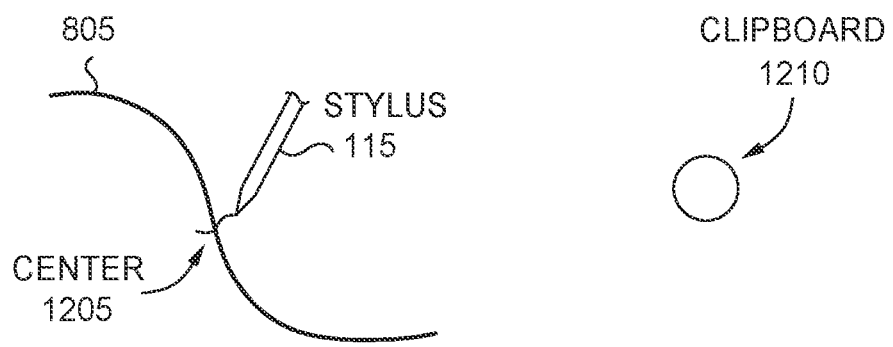
FIGS. 12A and 12B illustrate adding a selected portion to a needle point path, according to one embodiment.
Figure 12B:
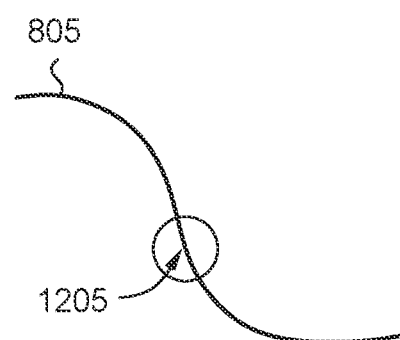

FIGS. 12A and 12B illustrate adding a selected portion to a needle point path, according to one embodiment. In FIG. 12A, the user can use the stylus 115 to indicate a center 1205, which indicates a location to put a needle point path in a clipboard 1210. In this example, the user can use the stylus to make a slash on the needle point path 805 which indicates the center 1205 where to place the needle point path saved in the clipboard 1210.

The needle point path in the clipboard 1210 may not be currently displayed on the device during FIG. 12A. For example, the user may be able to select various different needle point paths that are stored in the clipboard 1210. Once selected, the user can then make the slash on the needle point path 805. The intersection of the slash with the needle point path 805 indicates the center 1205 of where the needle point path in the clipboard 1210 should be placed.

In one embodiment, the needle point path in the clipboard 1210 may be a selected portion of another needle point path. The user may have used a "cut" editing task to remove this selected portion from that needle point path and store it in the clipboard 1210. The user can then use a "paste" editing task to then paste the selected portion from the clipboard 1210 onto the needle point path 805.

In one embodiment, the clipboard 1210 can include a catalog of different needle point paths. For example, the clipboard 1210 may include the most common used shapes in embroidery designs (e.g., circles, ovals, lines, squares, etc.). The user can then use the embodiments herein to add these needle points paths to an existing needle point path 805.

FIG. 12B illustrates the result of adding (or pasting) the needle point path in the clipboard 1210 onto the needle point path 805. Using the embodiments discussed above, the added needle point path can be combined with the needle point path 805 to generate a single needle point path.

Figure 13A:
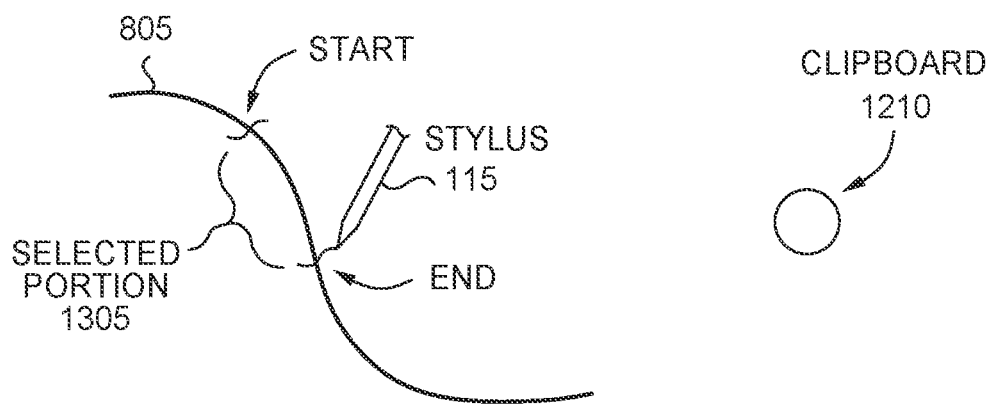
FIGS. 13A and 13B illustrate replacing a selected portion of a needle point path, according to one embodiment.
Figure 13B:
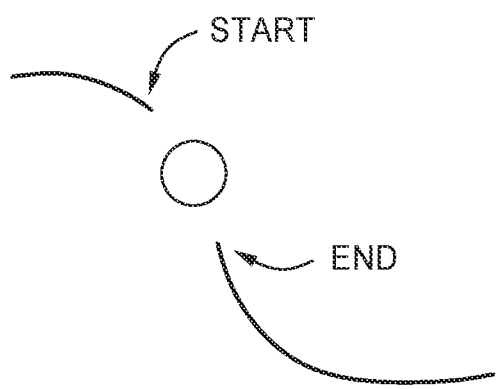

FIGS. 13A and 13B illustrate replacing a selected portion of a needle point path, according to one embodiment. FIG. 13A illustrates the user using the stylus 115 to indicate a start and an end of a selected portion 1305 of the needle point path 805. For example, the user can use the technique described in FIG. 8B to identify the selected portion 1305. However, the user can use any technique, such as the technique described in FIG. 8C, to identify the selected portion 1305.

The method 900 can then be used to identify a bounding box (not shown) and create the graphics region. In one embodiment, the user can then select a "replace" editing task to remove the selected portion 1305 and replace it with a needle point path from the clipboard 1210. For example, the user device may display a list of editing features (e.g., copy, delete, rotate, resize, replace, paste, etc.) that the user can select to perform various editing tasks.

FIG. 13B illustrates removing the selected portion 1305 from the path 805 and replacing it with the needle point from the clipboard 1210. In one embodiment, the process in FIGS. 13A and 13B can be expressed as a delete followed by an addition (or paste) of the needle point path in the clipboard 1210.

In one embodiment, the operating system adds the path in the clipboard 1210 at the center of the selected portion 1305 (e.g., a center of the bounding box encapsulating the portion 1305). In another embodiment, the operating system can prompt the user to indicate where to place the needle point path in the clipboard 1210 which can occur before or after the selected portion 1305 has been removed.

Figure 14:
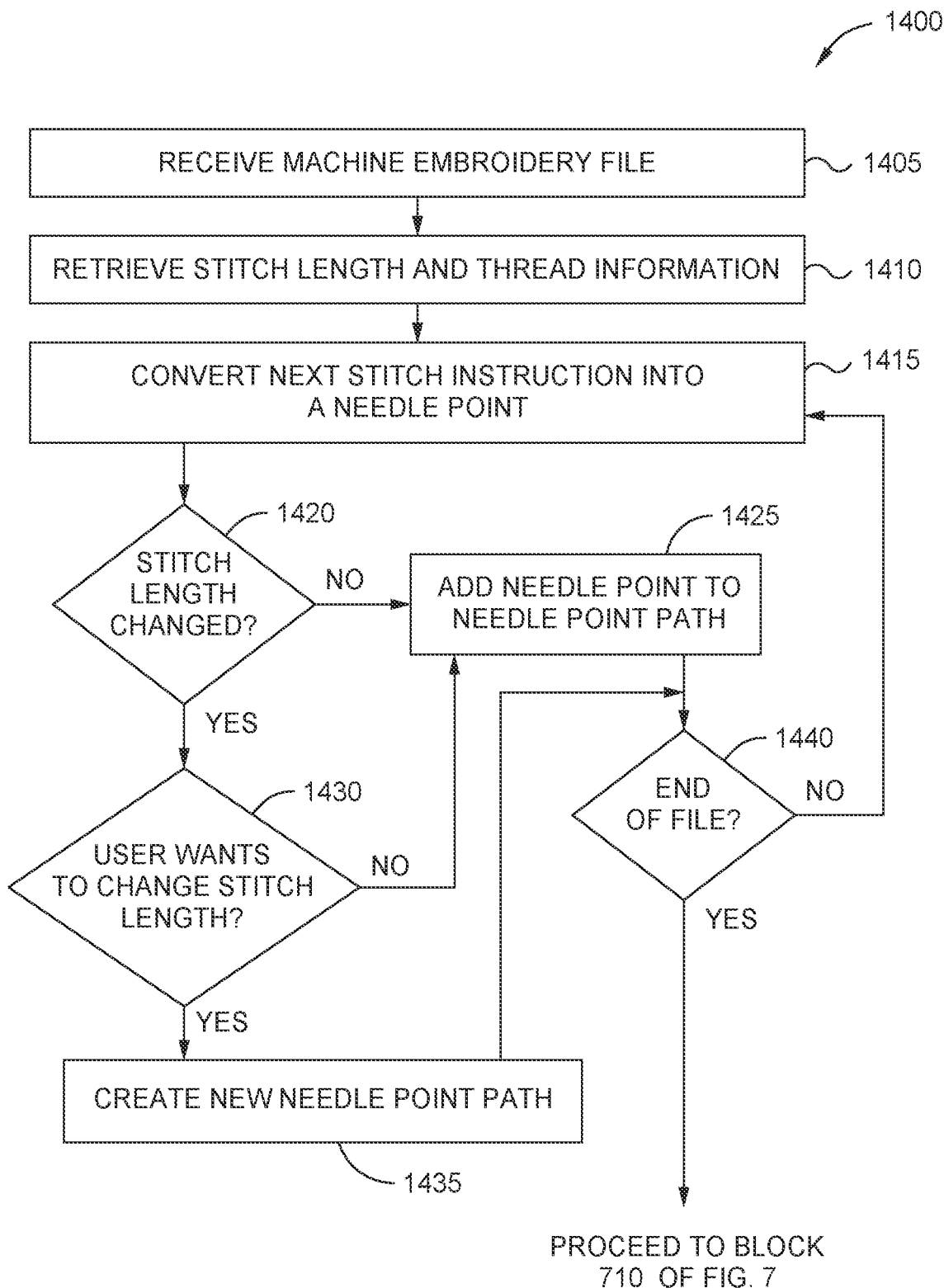
FIG. 14 is a flowchart for converting a machine embroidery file into a needle point path, according to one embodiment.

FIG. 14 is a flowchart of a method 1400 for converting a machine embroidery file into a needle point path, according to one embodiment. As mentioned above at block 705 of the method 700, an machine embroidery file may be used to identify a needle point path. However, this file includes instructions for an embroidery machine, and thus, is not in the same format or have the same data structures as a needle point path. The method 1400 can be used to convert the data in a machine embroidery file into a needle point path.

At block 1405, the embroidery application receives a machine embroidery file which may have been selected or loaded by the user.

At block 1410, the embroidery application retrieves stitch length and thread information. In some embodiments, the stitch length and the thread information (e.g., type of thread) is provided in the embroidery machine file. If not, the embroidery application can use two of the stitch instructions in the file to determine the stitch length. That is, the embroidery application can plot the coordinates of the two stitches in an 2D plane and then use geometry to calculate the distance between the stitches, thereby indicating the stitch length. If the thread information is not in the file, the embroidery application can query the user.

At block 1415, the embroidery application converts the next stitch instruction in the file into a needle point. In one embodiment, the embroidery application translates the location or coordinates of the stitch instruction into a location for the needle point that will be displayed on the user device.

At block 1420, when parsing the stitch instructions in the file, the embroidery application determines whether the stitch length has changed. That is, some machine embroidery files can support changes in stitch length (as well as thread changes). As an example, the file may indicate that the first half of the stitches should be made using a first stitch length, but then a second stitch length is used for the remaining stitches because, e.g., a different thread is used. Thus, the embroidery application can identify the distance from the location of the current stitch instruction to the location of the previous stitch instruction to determine whether the stitch length has changed.

If the stitch length remains the same, then at block 1425 the embroidery application adds the needle point to the needle point path. In this manner, the embroidery application converts each of the stitch instructions into a needle point which is then combined with previously identified needle points to form a needle point path.

At block 1440, the embroidery application determines whether it has parsed the entire machine embroidery file, and if not returns to block 1415 to fetch another stitch instruction.

If at block 1420 the application determines that the stitch length has changed, then the method 1400 proceeds to block 1430 where the embroidery application queries the user to determine if they want the stitch length to change. If the user says no, the method 1400 proceeds to block 1425 where the current needle path is added to the current needle point path, but using the current stitch length. This may require the embroidery application to modify the location of the needle point so it satisfies the current stitch length (e.g., moving the needle point further away from, or closer to, the previous needle point).

However, if the user wants to change the stitch length, the method 1400 proceeds to block 1435 where the embroidery application creates a new needle point path that uses the new stitch length. In one embodiment, each time the stitch length changes in the machine embroidery file (and with the user's permission), the embroidery application generates a new needle point path. The method 1400 can then proceed to block 1425 where the current needle point is added to the new needle point path.

Once the method 1400 has reached the end of the machine embroidery file, the method proceeds to block 710 of FIG. 7 where the user can then edit the needle point path (or paths) using the techniques discussed above.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying a needle point path representing a plurality a stitches with locations on a 2D plane;
   displaying the needle point path on a touch screen;
   identify at least a portion of the needle point path to edit using the touch screen;
   converting the portion into a graphics region by identifying a bounding box that encapsulates the portion;
   performing an editing task on the graphics region;
   determining, after performing the editing task, stitch points by performing graphic interpolation on the graphics region and based on a stitch distance; and
   generating a new needle point path based on the stitch points.

2. The method of claim 1, wherein the portion is a sub-portion of the needle point path and generating the new needle point path comprises:
   adding the stitch points to an unedited portion of the needle point path to generate the new needle point path.

3. The method of claim 1, wherein identifying the portion of the needle point path to edit comprises:
   identifying, based on detecting an input element proximate to the touch screen, a start and an end of the portion of the needle point path.

4. The method of claim 3, wherein the start and the end correspond to the input element intersecting the needle point path at two locations when the needle point path is displayed on the touch screen.

5. The method of claim 4, wherein the bounding box intersects the needle point path at the start and the end of the portion.

6. The method of claim 1, wherein performing the editing task comprises at least one of moving, rotating, shrinking, enlarging, deleting, or replacing the graphics region thereby performing a corresponding action on the portion of the needle point path in the graphics region.

7. The method of claim 1, further comprising:
generating a machine embroidery file based on the new needle point path.

8. The method of claim 1, wherein identifying the needle point path comprises:
receiving a machine embroidery file;
receiving a stitch length and thread information;
converting a stitch instruction in the machine embroidery file into a needle point;
comparing a location of the stitch instruction with a location of a previous stitch instruction in the machine embroidery file to determine whether the stitch length has changed; and
upon determining the stitch length has changed, creating a new needle point path and adding the needle point into the new needle point path.

9. A non-transitory computer-readable medium containing computer program code that, when executed by operation of one or more computer processors, performs an operation comprising:
identifying a needle point path representing a plurality a stitches with locations on a 2D plane;
displaying the needle point path on a touch screen;
identify at least a portion of the needle point path to edit using the touch screen;
converting the portion into a graphics region by identifying a bounding box that encapsulates the portion;
performing an editing task on the graphics region;
determining, after performing the editing task, stitch points by performing graphic interpolation on the graphics region and based on a stitch distance; and
generating a new needle point path based on the stitch points.

10. The non-transitory computer-readable medium of claim 9, wherein the portion is a sub-portion of the needle point path and generating the new needle point path comprises:
adding the stitch points to an unedited portion of the needle point path to generate the new needle point path.

11. The non-transitory computer-readable medium of claim 9, wherein identifying the portion of the needle point path to edit comprises:
identifying, based on detecting an input element proximate to the touch screen, a start and an end of the portion of the needle point path.

12. The non-transitory computer-readable medium of claim 11, wherein the start and the end correspond to the input element intersecting the needle point path at two locations when the needle point path is displayed on the touch screen.

13. The non-transitory computer-readable medium of claim 12, wherein the bounding box intersects the needle point path at the start and the end of the portion.

14. The non-transitory computer-readable medium of claim 9, further comprising:
generating a machine embroidery file based on the new needle point path.

15. The non-transitory computer-readable medium of claim 9, wherein identifying the needle point path comprises:
receiving a machine embroidery file;
receiving a stitch length and thread information;
converting a stitch instruction in the machine embroidery file into a needle point;
comparing a location of the stitch instruction with a location of a previous stitch instruction in the machine embroidery file to determine whether the stitch length has changed; and
upon determining the stitch length has changed, creating a new needle point path and adding the needle point into the new needle point path.

16. A system, comprising:
one or more computer processors; and
a memory containing a program which when executed by the one or more computer processors performs an operation, the operation comprising:
identifying a needle point path representing a plurality a stitches with locations on a 2D plane;
displaying the needle point path on a touch screen;
identify at least a portion of the needle point path to edit using the touch screen;
converting the portion into a graphics region by identifying a bounding box that encapsulates the portion;
performing an editing task on the graphics region;
determining, after performing the editing task, stitch points by performing graphic interpolation on the graphics region and based on a stitch distance; and
generating a new needle point path based on the stitch points.

17. The system of claim 16, wherein the portion is a sub-portion of the needle point path and generating the new needle point path comprises:
adding the stitch points to an unedited portion of the needle point path to generate the new needle point path.

18. The system of claim 16, wherein identifying the portion of the needle point path to edit comprises:
identifying, based on detecting an input element proximate to the touch screen, a start and an end of the portion of the needle point path.

19. The system of claim 18, wherein the start and the end correspond to the input element intersecting the needle point path at two locations when the needle point path is displayed on the touch screen.

20. The system of claim 19, wherein the bounding box intersects the needle point path at the start and the end of the portion.

* * * * *